(12) United States Patent
O'Hara-Smith

(10) Patent No.: US 6,227,673 B1
(45) Date of Patent: May 8, 2001

(54) ADJUSTABLE REFLECTOR

(76) Inventor: Stephen C. O'Hara-Smith, Colfitch House, Celbridge Co., Kildare (IE)

(*) Notice: Subject to any disclaimer, the term of this patent is extended or adjusted under 35 U.S.C. 154(b) by 0 days.

(21) Appl. No.: 09/269,721

(22) PCT Filed: Sep. 18, 1997

(86) PCT No.: PCT/EP97/05122

§ 371 Date: Jul. 2, 1999

§ 102(e) Date: Jul. 2, 1999

(87) PCT Pub. No.: WO98/14815

PCT Pub. Date: Apr. 9, 1998

(30) Foreign Application Priority Data

Oct. 1, 1996 (DE) .......................................... 296 17 111 U

(51) Int. Cl.⁷ .............................. G02B 5/08; G02B 7/182; G02B 26/08
(52) U.S. Cl. ...................... 359/850; 359/855; 359/872; 359/877; 359/223; 126/685; 126/689; 126/696
(58) Field of Search ..................................... 359/850, 851, 359/852, 853, 855, 872, 873, 874, 876, 877, 223, 212; 126/684, 685, 686, 688, 689, 696, 698, 699, 700

(56) References Cited

U.S. PATENT DOCUMENTS

| | | | |
|---|---|---|---|
| 895,761 | * | 8/1908 | Huntoon . |
| 1,093,498 | * | 4/1914 | Thring . |
| 1,658,455 | * | 2/1928 | Metzech et al. . |
| 3,884,217 | * | 5/1975 | Wartes . |
| 4,058,110 | * | 11/1977 | Holt . |
| 4,220,137 | * | 9/1980 | Tesch et al. . |
| 4,304,218 | | 12/1981 | Karlsson . |
| 4,307,709 | * | 12/1981 | Sletten et al. . |
| 4,392,482 | * | 7/1983 | Chang . |
| 4,463,749 | | 8/1984 | Sobczak et al. . |
| 4,473,065 | * | 9/1984 | Bates . |
| 4,491,125 | * | 1/1985 | Sainsbury . |
| 4,511,250 | * | 4/1985 | Olsen . |
| 4,577,620 | * | 3/1986 | Clegg . |
| 5,374,317 | | 12/1994 | Lamb et al. . |

FOREIGN PATENT DOCUMENTS

| | | |
|---|---|---|
| 132 998 | 11/1978 | (DD) . |
| 705839 | 4/1941 | (DE) . |
| 27 22 992 | 12/1977 | (DE) . |
| 30 26 834 | 2/1981 | (DE) . |
| 3536390 C2 | 4/1987 | (DE) . |
| 88 03 720 | 6/1988 | (DE) . |

(List continued on next page.)

OTHER PUBLICATIONS

*Silvered–PMMA reflectors*, "Solar Energy Materials and Solar Cells 33" (1994) 183–197, Paul Schissel, Gary Jorgensen, Cheryl Kennedy, and Rita Goggin.

*An Array of Dirrectable Mirrors as a Photovoltaic Solar Concentrator*, "Solar Energy", vol. 24, pp. 221–234, (10/78), W. B. Ittner, III.

Primary Examiner—Ricky D. Shafer
(74) Attorney, Agent, or Firm—Nixon Peabody LLP; Donald R. Studebaker

(57) ABSTRACT

The invention relates to an adjustable reflector having a first plate made of substantially transparent material, a second plate positioned substantially parallel to the first plate, and a reflector element rotatably mounted between the first plate and the second plate. The reflector element is at least partially transparent and has a substantially spherical shape and a reflective surface. In addition, at least one of the plates is movable relative to the other while maintaining the distance between the first plate and the second plate. Preferably, a plurality of reflector elements is rotatably mounted between the first plate and the second plate, each reflector element being two hemispheres with a reflective surface positioned on an equatorial plane. Driving devices may also be provided for moving at least one of the plates.

15 Claims, 1 Drawing Sheet

FOREIGN PATENT DOCUMENTS

| | | |
|---|---|---|
| 4009754 A1 | 1/1991 | (DE) . |
| 94 17 466 | 3/1995 | (DE) . |
| 0 130 585 | 1/1985 | (EP) . |
| 0 631 163 A1 | 12/1994 | (EP) . |
| 1.475.393 | 3/1967 | (FR) . |
| 2 688 601 | 9/1993 | (FR) . |
| 2 255 195 | 10/1992 | (GB) . |
| 60-117053 | 6/1985 | (JP) . |

* cited by examiner

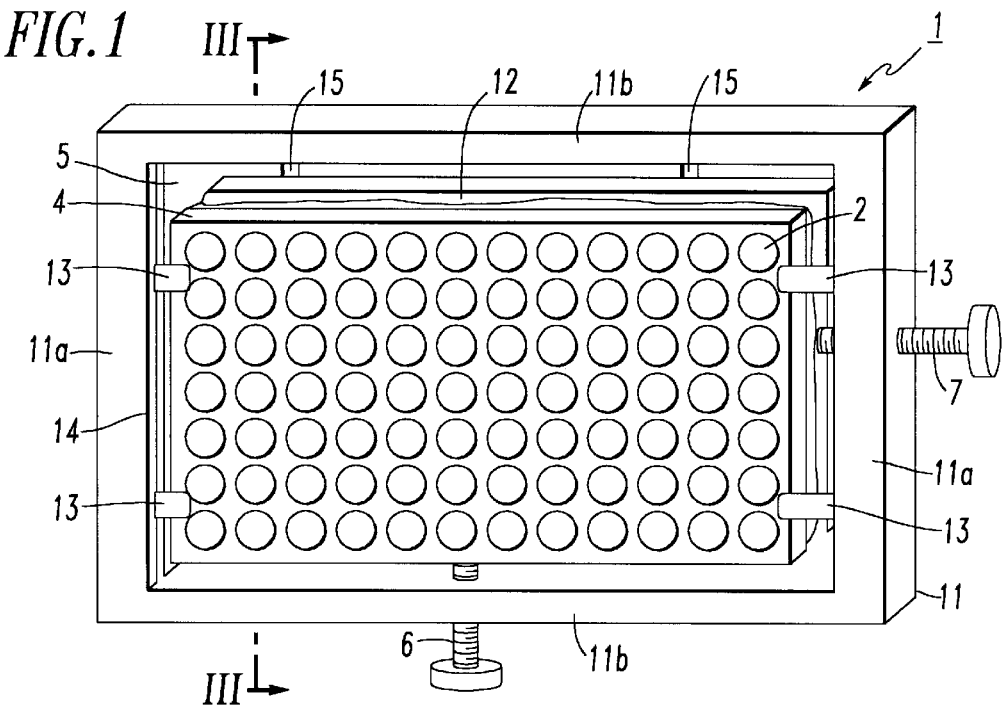
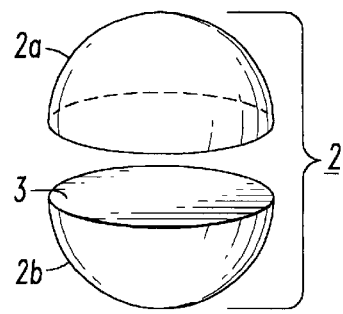
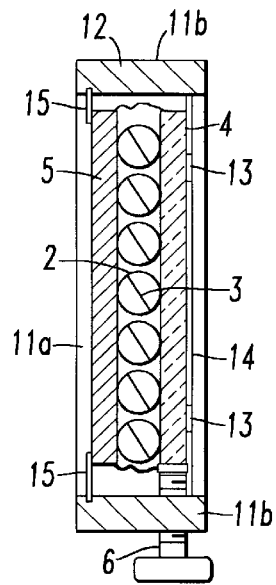
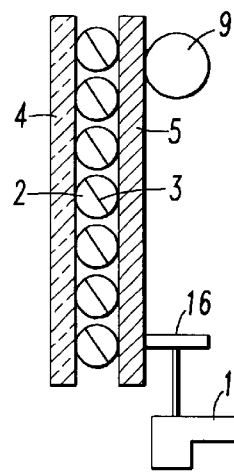
FIG.1
FIG.2
FIG.3
FIG.4

ADJUSTABLE REFLECTOR

BACKGROUND OF THE INVENTION

1. Field of the Invention

The invention relates to an adjustable reflector having several rotatable reflector elements, each of these reflector elements having a reflective surface.

2. Description of Related Art

Reflectors are generally used to deflect electromagnetic radiation such as light. Reflectors are frequently used for advertising purposes, in connection with signaling systems or for the purpose of directing sunlight in a particular direction, for example, to a solar collector. The reflectors, or its reflector elements, must be rotated in order to change the angle of reflection, for instance, to adjust to the changing position of the sun.

An adjustable reflector of the above type is generally disclosed in the U.K. Patent Application GB 2 255 195 A. In such adjustable reflectors, it is not necessary to align the entire reflector, which is frequently very bulky, in order to change the direction of the surface normal of the reflector surface and thereby the direction of the reflected rays. This can be accomplished by adjusting the individual rotatable reflector elements of this type of reflector in such a way that the surface normal of their respective reflector surfaces are rotated to a particular direction thereby obtaining the required reflection angle. This type of reflectors are also disclosed in U.S. Pat. No. 4,304,218 and in the French reference FR 2 688 601-A1.

In these prior art adjustable reflectors, mechanically connecting the reflector elements in order to rotate them together in parallel has proven to be a major technical problem. The requirements of precision and speed when changing the direction of the reflector elements could only be met to a limited extent in these prior art reflectors because of the relatively complicated structure of their reflector elements and/or their operating mechanism. In addition, such prior art reflectors do not provide a quick response time so that they could not be effectively used in applications where an objective was to change the performance of a solar collector by quickly adjusting and/or "de-adjusting" the reflector within a short span of time.

SUMMARY OF THE INVENTION

In light of the above noted shortcomings and problems with the prior art reflectors, the primary object of the present invention is to create an adjustable reflector that overcomes these deficiencies.

In this regard, another object of the present invention is to provide an adjustable reflector which is cost-effective with comparatively few expensive components.

Another object of the present invention is to provide an adjustable reflector which is sturdy, robust and is comparatively small in size.

Still another object of the present invention is to provide and adjustable reflector with a quick response time so that it can be aligned and adjusted within a short span of time.

These objectives are achieved by an adjustable reflector having reflector elements which are substantially spherical in shape which are at least partially transparent. Each of these reflector elements also have a reflective surface and are mounted between two parallel plates. At least one of the two plates is substantially transparent and at least one of the two plates can be moved relative to the other while maintaining the distance from the other plate. Because one of the two plates can be moved relative to the other, the spherical reflector elements mounted between the two plates are mechanically connected together and are rotated in the same direction by moving the movable plate appropriately. This allows the adjustment or alignment of surface normals of the reflector surfaces of each reflector element.

A relative movement between the two plates equivalent to the circumference of the reflector elements permits a rotation of the surface normals of the reflector surface through 180°. This means that with a reflector element having a diameter of 2.5 cm and a circumference of approx. 7.85 cm, the entire adjustment range of 180° will be covered when a plate is moved by as little as 7.85 cm. In practice, however, much smaller adjustment ranges are adequate. Owing to the short adjustment distances, the adjustment can be made within a few seconds. Consequently, the adjustable reflector in accordance with the present invention may be used in applications where quick response time is required such as when it is desirable to quickly change the performance of a solar collector by adjusting and/or "de-adjusting" the reflector within a short period of time.

In one particularly advantageous embodiment of the present invention, the reflector elements can be rotated in at least two directions so that surface normal of the reflector surfaces can cover almost any direction in a hemispherical range. Moreover, the present invention is particularly advantageous since the reflector elements are mechanically connected and can be rotated together, preferably in a synchronized manner. This eliminates the need for individual adjustment of each reflector element.

The reflective surface of the reflector element may be made of an aluminum foil or a silver foil, especially if the adjustable reflector is to be used reflect visible light. The reflector elements may be made of glass or plastic. Glass is preferable because of its optical properties while plastic reflector elements are less expensive to manufacture.

In accordance with another embodiment of the present invention, each reflective surface may be positioned in an equatorial plane of each reflector element. From a technical manufacturing perspective, this can best be done if the reflector element is two hemispheres with the reflective surface being positioned on a flat surface of one of the two hemispheres.

In accordance with another embodiment of the present invention, a first driving device is provided to move at least one of the two plates in one direction relative to the other one of the two plates. A further advantageous embodiment of the present invention would be obtained if a second driving device is provided which facilitates moving one of the two plates in another direction perpendicular to the first direction. With two such driving devices, the surface normal of the reflection surface can be aligned and adjusted to any direction.

The driving device and/or devices for moving at least one of the two plates relative to one another, may be a simple, manually operated threaded spindles. However, in a particularly advantageous embodiment of the invention, the driving device is a motorized device which may be used to facilitate the alignment and adjustment of at least one of the two plates in one or more directions. The motorized device should preferably be a linear or step motor with gears. This embodiment of the invention will facilitate easy setting of the surface normal of the reflective surface and allow the adjustable reflector in accordance with the present invention to be remotely controlled or controlled by a computer-supported system. With a computer-supported system, for example, where the adjustable reflector is used in conjunction with a solar collector, the reflection angle could be adjusted in accordance with the changing position of the sun so as to precisely direct the sun's rays at the solar collector. The computing power of a standard personal computer (PC) has proven to be sufficient in providing this type of control, even if control of an array of several adjustable reflectors is required.

In yet another embodiment of the present invention, at least one of the two plates may be coated with an elastic substance such as a foam material to enhance friction and to ensure even pressure on the reflector elements mounted between the two plates.

In still another embodiment of the present invention, the adjustable reflector may be provided with a housing frame.

These and other objects, features and advantages of the present invention will become more apparent from the following detailed description of the invention when viewed in conjunction with the accompanying drawings.

BRIEF DESCRIPTION OF THE DRAWINGS

FIG. 1 shows a perspective view of an adjustable reflector in accordance with one embodiment of the present invention.

FIG. 2 shows a perspective view of a reflector element consisting of two hemispheres.

FIG. 3 shows a cross-section of the adjustable reflector of FIG. 1 as viewed along the line III—III.

FIG. 4 shows another cross-section of an alternative embodiment of an adjustable reflector in accordance with the present invention.

DETAILED DESCRIPTION OF THE PREFERRED EMBODIMENT

The adjustable reflector 1 in accordance with one embodiment of the present invention as shown in FIG. 1 has a first plate 4 which is made from a transparent material such as glass or plastic. At a predetermined distance from the first plate 4, there is provided a second plate 5 which is parallel to the first plate 4 which may be made of a transparent material or a non-transparent material such as metal. The adjustable reflector 1 also includes reflector elements 2 which are substantially spherical in shape that are mounted between the two plates 4 and 5. In the illustrated embodiment of FIG. 1, there are a total of 7×12 reflector elements 2 in the adjustable reflector 1. However, it can be appreciated that in different applications, there could naturally be a far larger number of reflector elements 2, depending on the overall size of the adjustable reflector 1. As an example, typical size for the adjustable reflector 1 in many applications may be one square meter. A typical size for the spherical reflector elements 2 could be 2.5 cm in diameter, whereby the individual balls would be arranged a few millimeters from one another so that there could be approx. 35 reflector elements in each direction and a total of approx. 1225 reflector elements in one adjustable reflector 1. Of course, it should also be recognized that the size of the reflector elements 2, their spacing, and their particular arrangement is noted and described as an example only and may be easily modified depending on the application and requirements of the adjustable reflector 1.

The first plate 4 and the second plate 5 are connected to one another by an expansion bellow 12 which creates an airtight connection so that no dirt or contaminants can penetrate the interior space between the first plate 4 and the second plate 5. However, the first plate 4 and the second plate 5 are not rigidly connected to one another but instead, the plates can be moved relative to each other within predetermined limits. This movement also maintains both the first plate 4 and the second plate 5 in its own plane thus keeping the distance between the first plate 4 and the second plate S constant.

FIG. 2 shows the structure of one reflector element 2 in accordance with the preferred embodiment of the present invention. As can be seen from FIG. 2, the reflector element 2 comprises two transparent hemispheres 2a and 2b which, in the present embodiment, are made of plastic. A reflector surface 3 is applied to the cross-section plane of hemisphere 2b. This reflector surface 3 may be made of aluminum foil bonded to the hemisphere 2b. The two hemispheres 2a and 2b which are shown separated in FIG. 2 for illustration purposes, are fixedly bonded to one another. This bonding may be attained by using an adhesive or a glue. Of course, alternative embodiments of the reflector element 2 is also encompassed in the present invention. For instance, the reflective surface 3 of the reflector element 2 may be made of an aluminum foil or a silver foil, especially if the adjustable reflector is to be used reflect visible light. The reflector elements may be made of glass or plastic. Glass is preferable because of its optical properties while plastic reflector elements are less expensive to manufacture. Moreover, each reflective surface 3 may be positioned in an equatorial plane of each reflector element 2. From a technical manufacturing perspective, this can best be done if the reflector element 2 is two hemispheres 2a, 2b with the reflective surface 3 being positioned on a flat surface of one of the two hemispheres as illustrated in FIG. 2. However, the reflective surface 3 may also be positioned on a plane of each reflective element 2 at a predetermined distance from the equatorial plan.

In the adjustable reflector 1 shown in FIG. 1, the reflector elements 2 described above are held between the first plate 4 and the second plate 5 by frictional contact between the surface of the reflector element 2 and the two plates. To further ensure that all the reflector elements 2 are subject to substantially the same pressure which is sufficient to guide them frictionally between the two plates without slippage, an elastic foam layer (not shown) may be provided on the side of the second plate 5 which contacts the reflector elements. Of course, the elastic layer can be numerous things including a coating, foam or an elastomeric compound.

The first plate 4 and the second plate 5 of the adjustable reflector 1 in accordance with the preferred embodiment are movably supported in a rectangular frame 11. The frame comprises two vertical limbs 11a and two horizontal limbs 11b. The first plate 4 is supported in the rectangular frame 11 in a manner to allow the first plate 4 to be moved in a vertical direction (vertical relative to the illustration of FIG. 1). In addition, the second plate is supported in the rectangular frame 11 in a manner to allow the second plate 5 to be moved in a horizontal direction (horizontal relative to the illustration of FIG. 1). In this regard, the first plate 4 may be fitted with four vertical sliding feet 13, each of which engages corresponding vertical guide grooves 14 (only one shown) provided in the vertical limbs 11a of frame 11.

In the present illustrated embodiment of the adjustable reflector 1 in accordance with the present invention, the first plate 4 can be moved in a precise vertical direction in the plane of the first plate 4 by using a driving device such as a first threaded spindle 6 which is connected to the first plate 4 and is mounted on the horizontal limb 11b of frame 11 through a threaded hole (not shown).

In a similar manner, the second plate 5 illustrated in FIG. 1 is fitted with horizontal sliding feet 15 which engage in horizontal guide grooves (not shown) in the horizontal limbs 11*b* of frame 11 and allow horizontal movement of the second plate 5. This movement can be effectuated using a second threaded spindle 7 which is connected to the second plate 5 and is mounted on the vertical limb 11 a of frame 11 through a threaded hole (not shown). Thus, the first plate 4 can be precisely positioned in a vertical direction while the second plate 5 can be precisely positioned in a horizontal direction. By guiding the first plate 4 and the second plate 5 through the vertical guide grooves 14 and the horizontal guide grooves (not shown), it is possible to ensure that the first plate 4 and the second plate 5 always remain parallel and that the distance between these plates remains constant so that the spherical reflector elements 2 positioned between the first plate 4 and the second plate 5 are always pressed with a constant force.

The surface normals of the reflector surfaces 3 in the spherical reflector elements 2 can be aligned in a vertical direction by moving the first plate 4 in a vertical direction (vertical relative to the illustration of FIG. 1) by adjusting the driving device such as the first threaded spindle 6. The movement of the first plate 4 by a few centimeters is generally sufficient to align the reflector surfaces 3 in almost any angle required in the vertical direction. Consequently, the installation of expensive rotating devices which require a lot of space is thereby eliminated.

In the same manner, the surface normals of the reflector surfaces 3 in the spherical reflector elements 2 can be aligned in a horizontal direction by moving the second plate 5 in a horizontal direction (horizontal relative to the illustration of FIG. 1) by adjusting a driving device such as the second threaded spindle 7. The movement of the second plate 4 by a few centimeters is generally sufficient to align the reflector surfaces 3 in almost any angle required in the horizontal direction. Therefore, the surface normals of the reflector surfaces 3 in the spherical reflector elements 2 can be easily adjusted and aligned in the manner described above. Moreover, the surface normals of the reflector surfaces in the spherical reflector elements 2 are adjusted and aligned together since they are mechanically connected by the first plate 4 and the second plate 5.

The cross-section shown in FIG. 3 provides a particularly good illustration of how the spherical reflector elements 2 can be mounted between the first plate 4 and the second plate 5. As noted previously, the first plate 4 and the second plate 5 are sealed by expansion bellows 12 which prevent any dirt or contaminants from entering the space between the plates. FIG. 3 also illustrates a driving device such as a first adjusting spindle 6 and the vertical sliding feet 13 provided on the first plate 4 which engage the vertical guide grooves 14 and facilitate vertical movement of the first plate 4. FIG. 3 also clearly shows the horizontal sliding feet 15 which are provided on the second plate 5 which engage the horizontal guide groove 17 in the horizontal limbs 11*b* in order to ensure the horizontal guidance of the second plate 5.

FIG. 4 shows another cross-section of an alternative embodiment of an adjustable reflector 1. As can be clearly seen, the reflector elements 2 are again fitted between the first plate 4 and the second plate 5. In this alternative embodiment, however, one of the two plates, such as the transparent first plate 4, is rigidly connected to a frame (not illustrated). Only the second plate 5 is movably supported in the frame and is moved perpendicular to the plane of the Figure (i.e. in a horizontal direction) by a driving device such as a first motorized device 8. In this alternative embodiment, the first motorized device 8 comprises a motor 10, gears (not shown) and drive wheel 16. Of course, other driving devices may also be used to yield the desired movement such as cams, cranks, levers, etc. In addition, a corresponding second motorized device 9 can also be provided to move the second plate 5 in a vertical direction. This second motorized device 9 is illustrated in FIG. 4 as being installed at an angle of 90°. For reasons of clarity, details of how the first motorized device 8 and the second motorized device 9 are mounted have been omitted. However, such mountings of driving devices are known in the art and need not be detailed here. Of course, it can also be easily appreciated that the driving devices discussed above, namely spindles and motorized devices, are given as examples only and the desired horizontal and vertical movement of at least one plate can likewise be attained by utilizing other devices.

Therefore, in the manner described above, the present invention provides an adjustable reflector which is cost-effective with comparatively few expensive components. The adjustable reflector 1 in accordance with the present invention is also sturdy, robust and is comparatively small in size. Because the reflector elements 2 can be rotated in at least two directions in the manner described above, that surface normal of the reflective surfaces 3 can cover almost any direction in a hemispherical range. Moreover, the present invention is particularly advantageous since the reflector elements 2 are mechanically connected and can be rotated together in a synchronized manner. This eliminates the need for individual adjustment of each reflector element 2. In addition, the adjustable reflector described above has a quick response time so that it can be aligned and adjusted within a short span of time. In this regard, relative movement between the first plate 4 and the second plate 5 equivalent to the circumference of the reflector elements 2 permits a rotation of the surface normals of the reflector surface 3 through 180°. This means that with a reflector element 2 having a diameter of 2.5 cm and a circumference of approx. 7.85 cm, the entire adjustment range of 180° will be covered when the relative movement between the first plate 4 and the second plate 5 is as little as 7.85 cm. In practice, however, much smaller adjustment ranges are likely to be adequate to align and adjust the adjustable reflector 1. Owing to the short adjustment distances, the adjustment can be made within a few seconds. Consequently, the adjustable reflector 1 in accordance with the present invention may be used in applications where quick response time is required such as when it is desirable to quickly change the performance of a solar collector by adjusting and/or "de-adjusting" the reflector within a short period of time.

Furthermore, the above described embodiment of the present invention utilizing motorized devices such as linear or step motors will facilitate easy setting of the surface normal of the reflective surface 3 and allow the adjustable reflector 1 to be remotely controlled or controlled by a computer-supported system (not shown). With a computer-supported system, for example, where the adjustable reflector 1 is used in conjunction with a solar collector (not shown), the reflection angle could be adjusted in accordance with the changing position of the sun so as to precisely direct the sun's rays at the solar collector. The computing power of a standard personal computer (PC) (not shown) has proven to be sufficient in providing this type of control, even if control of an array of several adjustable reflectors is required. Of course, such computer control of devices is generally known in the art and need not be detailed here.

While various embodiments in accordance with the present invention have been shown and described, it is to be understood that the invention is not limited thereto, and may be changed, modified and further applied by those skilled in the art. Therefore, this invention is not limited to the details shown and described previously, but also includes all such changes and modifications which are encompassed by the appended claims.

What is claimed is:

1. An adjustable reflector comprising:
   a first plate made of substantially transparent material;
   a second plate positioned substantially parallel to said first plate; and
   at least one reflector element rotatably mounted between said first plate and said second plate, said reflector element being at least partially transparent and having a substantially spherical shape and a reflective surface;
   wherein at least one of said first plate and said second plate is movable relative to the other and a distance between said first plate and said second plate is maintained.

2. An adjustable reflector of claim 1, wherein said at least one reflector element is rotatable in at least two directions.

3. An adjustable reflector of claim 1, further comprising a plurality of reflector elements rotatably mounted between said first plate and said second plate, wherein each of said plurality of reflector elements are substantially spherical, are rotated together and have a reflective surface.

4. An adjustable reflector of claim 3, wherein each of said plurality of reflector elements comprises two hemispheres with said reflective surface being positioned on an equatorial plane of each of said plurality of reflector elements.

5. An adjustable reflector of claim 4, further comprising a first driving device for moving at least one of said first plate and said second plate in a first direction and a second driving device for moving at least one of said first plate and said second plate in a second direction which is perpendicular to said first direction.

6. An adjustable reflector of claim 1, wherein said reflective surface comprises at least one of an aluminum foil and a silver foil.

7. An adjustable reflector of claim 1, wherein said at least one reflector element is made of at least one of glass and plastic.

8. An adjustable reflector of claim 1, wherein said reflective surface is positioned on an equatorial plane of said reflector element.

9. An adjustable reflector of claim 1, wherein said at least one reflector element comprises two hemispheres.

10. An adjustable reflector of claim 9, wherein at least one of said two hemispheres is transparent.

11. An adjustable reflector of claim 1, further comprising a first driving device for moving at least one of said first plate and said second plate in a first direction.

12. An adjustable reflector of claim 11, further comprising a second driving device for moving at least one of said first plate and said second plate in a second direction which is perpendicular to said first direction.

13. An adjustable reflector of claim 11, wherein said first driving device comprises a motor.

14. An adjustable reflector of claim 13, wherein said motor is at least one of a linear motor and step motor with gears.

15. An adjustable reflector comprising:
   a first plate made of substantially transparent material;
   a second plate positioned substantially parallel to said first plate;
   a plurality of reflector elements rotatably mounted between said first plate and said second plate, each reflector element comprising two hemispheres with a reflective surface positioned on an equatorial plane; and
   a first driving device for moving at least one of said first plate and said second plate in a first direction and a second driving device for moving at least one of said first plate and said second plate in a second direction which is perpendicular to said first direction;
   wherein a distance between said first plate and said second plate is maintained and said second plate having an elastic foam layer on a side facing said plurality of reflector elements.

* * * * *